United States Patent [19]
Duchemin

[11] 3,945,625
[45] Mar. 23, 1976

[54] LEAF SPRING

[75] Inventor: Michel Duchemin, Lambres-les-Douai, France

[73] Assignee: Ressorts Du Nord S. A., Paris, France

[22] Filed: May 21, 1973

[21] Appl. No.: 362,959

[30] Foreign Application Priority Data
May 29, 1972 France .................. 72.19183

[52] U.S. Cl. ........................ 267/47; 267/54 R
[51] Int. Cl.² ................................ F16F 1/18
[58] Field of Search ............. 267/47, 54 R, 52

[56] References Cited
UNITED STATES PATENTS

| | | | |
|---|---|---|---|
| 2,342,339 | 2/1944 | Hendrickson | 267/47 |
| 2,882,043 | 4/1959 | Benz | 267/47 |
| 3,190,632 | 6/1965 | Barenyi | 267/52 |
| 3,452,974 | 7/1969 | Dixon | 267/47 |
| 3,490,758 | 1/1970 | Foster | 267/47 |
| 3,645,522 | 2/1972 | Rowland | 267/54 R |
| 3,671,030 | 6/1972 | Marion | 267/54 R |
| 3,705,718 | 12/1972 | Fukui et al. | 267/47 |

Primary Examiner—Evon C. Blunk
Assistant Examiner—Jeffrey V. Nase
Attorney, Agent, or Firm—Burns, Doane, Swecker & Mathis

[57] ABSTRACT

A very light and high efficiency leaf spring made from a curved hollow tube with flattened opposite ends, cross section of said tube having a form which varies progressively from the center part of the tube towards each opposite ends but wall of the tube having the same area in any cross section throughout the length of the leaf.

3 Claims, 12 Drawing Figures

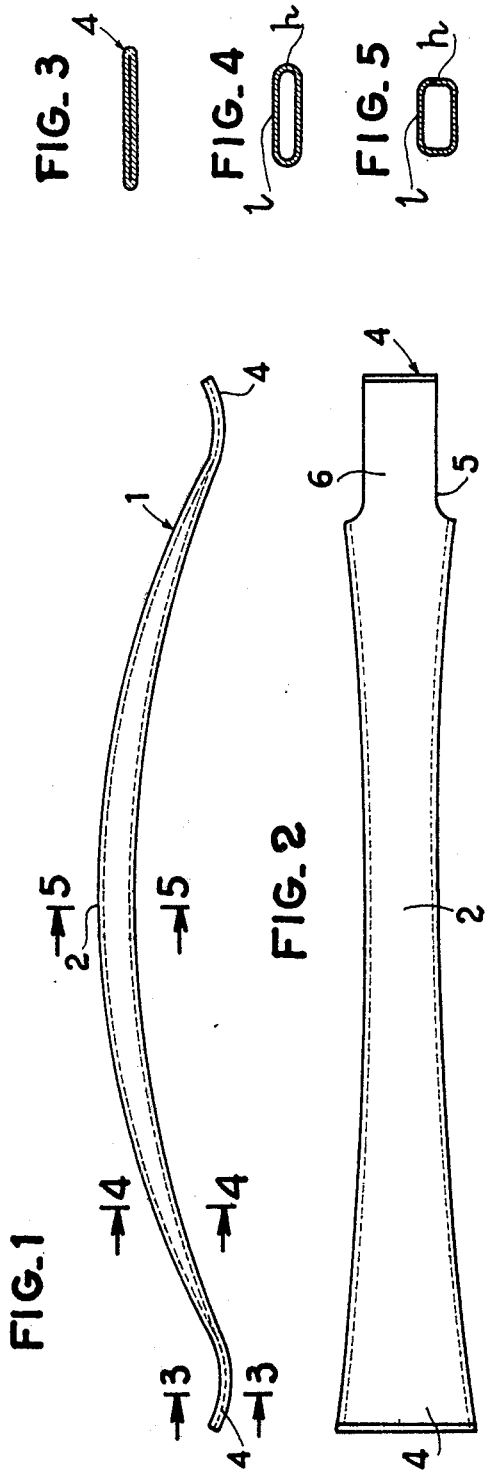
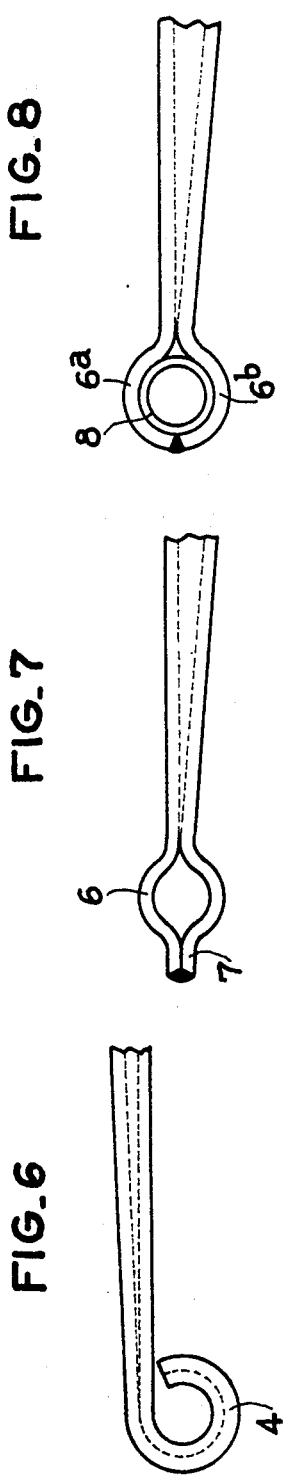

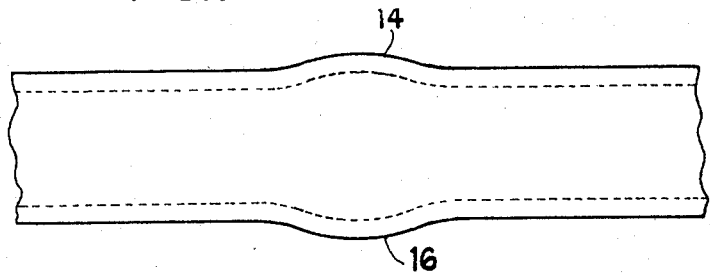
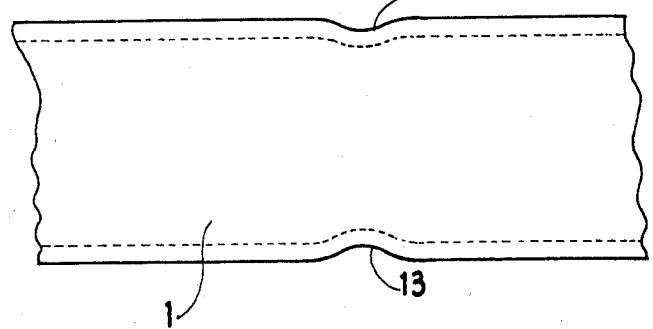
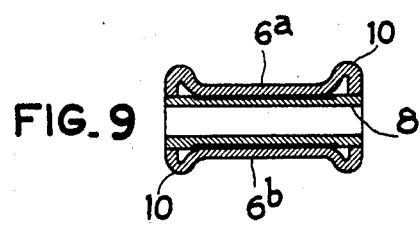
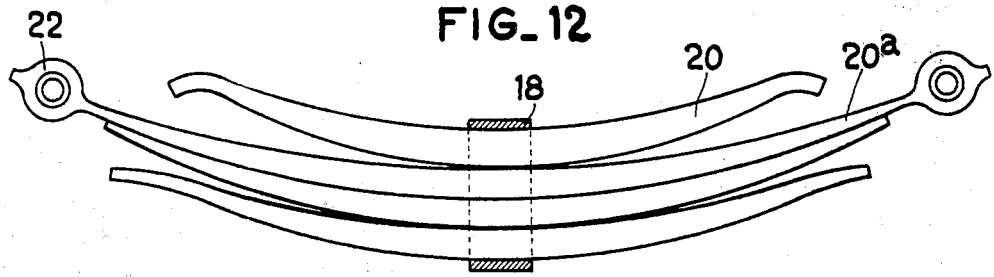

LEAF SPRING

The present invention relates to leaf or laminated springs and more particularly to those which are intended for vehicle suspensions.

An object of the present invention is to provide a spring which satisfies requirements as to stability of the vehicles but which is light. Weight reduction is in fact an important present-day problem in particular in the construction of vehicles.

Moreover, heat-treating requirements tend to lead to a reduction in the thicknesses of the material of the leaves or laminations whereas vehicle stability requires that the spring be as narrow as possible at least in the region of fastening, for example to an axle. These requirements have resulted in the construction of springs by means of leaves or laminations, whose thickness and weight vary along their length and which are very thick and also as narrow as possible in their centre part where they are fastened and have thin end portions. The difficulties of heat treating are thus reduced but not eliminated all together since the leaf always has at least one thick part.

These drawbacks are avoided according to the present invention which provides a leaf spring which comprises at least one tubular curved leaf, the thickness and width of which vary without modification of the area of its wall in cross section. Such a spring is light and its heat treatment is facilitated, since the thickness of the material of the leaf remains thin at every point of the leaf. However, this leaf has sufficient modulus of inertia throughout its length.

Further features and advantages of the invention will be apparent from the ensuing description with reference to the accompanying drawings.

In the drawings:

FIG. 1 is a side elevational view of a leaf or lamination of a spring according to the invention;

FIG. 2 is a plan view of the leaf shown in FIG. 1;

FIGS. 3, 4 and 5 are sectional views taken on lines 3—3, 4—4 and 5—5 of FIG. 1;

FIGS. 6, 7 and 8 are side elevational views of three embodiments of an eye formed at the end of the leaf;

FIG. 9 is a cross-sectional view of another embodiment of an eye formed at the end of the leaf;

FIG. 10 is a plan view of the centre part of a leaf of a spring adapted to receive fastening means;

FIG. 11 is an elevational view of the part of the leaf shown in FIG. 10, and

FIG. 12 is a side elevational view of a leaf spring according to the invention comprising a series of leaves or laminations.

The leaf or lamination of a spring shown in FIGS. 1 and 2 comprises a tubular element 1 having a generally curved shape the height of which decreases from its centre part 2 to its ends 4 as seen in FIG. 1. This leaf has indeed a cross-sectional shape which is substantially rectangular in the presently-described embodiment and whose height $h$ and width $l$ vary along the length of the leaf. The area of the wall of tube 1 in this cross section is always constant but its shape and its dimensions change progressively. In other words, the leaf has a perimeter that is substantially constant and a wall thickness that is substantially constant. For example, as shown in FIGS. 3, 4 and 5, the end portions 4 of the leaf are completely flattened (FIG. 3), the upper and lower walls of the tube being applied against each other, then the height $h$ of the leaf increases progressively, in passing through an intermediate shape shown in FIG. 4 in which the width $l$ has decreased with increase in the height $h$, so that the cross section reaches in the centre part of the leaf at point 2 the shape shown in FIG. 5. The height $h$ is then at its maximum value whereas its width $l$ is minimum as is clear from FIG. 2.

The amount of material of which the leaf is composed and the thickness of the wall of the tubular element which forms the leaf remain constant throughout its length notwithstanding the variation in the sectional shape. The area of the wall in each cross section of the tube is therefore also constant. Consequently, in the case of a spring formed by a leaf whose centre part is fixed, for example, to the axle of a vehicle whereas its ends are maintained by eyes, it is sufficient to choose the cross section in such manner that it has a modulus of inertia which is sufficient to resist the bending moment due to the load at the centre point 2, the bending moment in all the other sections being lower and decreasing proportionally with the distance of the section from the end.

The leaf is preferably constructed without welding from a tube of constant section whose wall has a uniform thickness. This tube is then deformed in a die so as to have a section whose width and thickness vary along its length. This leaf 1 may also be formed from a tube whose constant sectional area throughout its length comprises parts having different thickness, the smallest thickness is then placed on the side of the tube intended to be subjected to compressive stress and the tube is deformed as before.

Likewise, instead of being constructed from a closed tube, the tubular leaf or lamination could be made from a split tube or a strip or sheet of metal which is bent or coiled onto itself and whose edges are welded or merely brought together, the weld line or the longitudinal split between the brought-together edges being placed on the side of the spring which is intended to be subjected to compressive stress.

Irrespective of the embodiment chosen, the flattened end portions 4 adapted to form the eyes are preferably wound onto themselves as shown in FIG. 6. However, in some cases it may be more advantageous to laterally cut away or notch each side 5 of the end portion 4 of the leaf so as to constitute two superimposed substantially rectangular tab portions 6 (FIG. 2). The two tab portions 6 are bent so as to constitute an eye and their parallel end portions 7 are clamped against each other and maintained, for example, by welding (FIG. 7).

In a modification of the invention, the tab portions $6^a$ and $6^b$ do not constitute in themselves an eye but are bent around a small cylindrical tube 8 (FIG. 8) and welded together and to the tube 8. They may also be fitted on the tube 8 as shown in FIG. 9 in which reinforcing ribs 10 are formed on each of the tab portions $6^a$ and $6^b$ by a deformation of marginal parts of the tab portions.

Further, a strap or other fastening means placed in the centre part of the leaf 1, may be easily held stationary with respect to the latter by means of a local constriction in the section of the tube constituting a recess 12, 13 on each side of the tube (FIG. 10), which constriction corresponds to a swelling 14 of the upper part and a swelling 16 of the lower part of the tube (FIG. 11). The fastening system is held in position in the recesses 12, 13. The leaf may if desired include a plurality of constrictions at suitable distances apart.

It must be understood that the spring may comprise only a single tubular leaf provided, for example, with two fastening eyes, or include a plurality of leaves 20 which are tubular or solid and have curves and lengths which are different in the same way as in conventional leaf springs (FIG. 12). The assembly of these leaves is then held against the first leaf by means of a strap 18 or any other fastening means and at least one leaf, such as leaf 20$^{a\cdot}$ has two fastening eyes 22 at its ends. Each of the leaves 20 is thus in contact in its centre part with at least one of the other leaves of the leaf spring.

The tubular leaf of a spring is thus employed in the same way as a solid leaf so as to form various types of spring. It has the strength and flexibility sufficient for this purpose. It has, moreover, the advantage of being distinctly lighter and easier to construct, since the heat treatment of the material of the leaf is effected on a thin wall throughout the length of the leaf irrespective of the shape of the tubular section.

Various other modifications may be made to the embodiment thus described without departing from the scope of the invention. For example, the shape of the secion of the leaf or leaves may be other than rectangular, for example elliptical, trapezoidal or other shape according to requirements.

Having now described my invention what I claim as new and desire to secure by letters patent is:

1. A leaf spring comprising at least one curved tubular shaped leaf consisting in a hollow tube having a wall, an inner cavity, two opposite ends which are flattened in section and cross-section, said cross-section having a shape which varies substantially throughout the length of the leaf, the wall having a perimeter which is constant and a thickness which is substantially constant in each cross-section throughout the length of the leaf, wherein at least one portion of the tubular leaf adjacent one of said flattened ends is notched laterally on two opposite sides and defines two superimposed tab portions which are curved in opposite directions so as to constitute each one half of a fastening eye, and means are provided to connect together the ends of said two tab portions, a cylindrical tube inserted between the two curved tab portions at each end of the tubular leaf, said means being welding, and lateral reinforcing ribs on each tab portion.

2. A leaf spring as claimed in claim 1, wherein the tubular leaf has at least one narrower portion for holding fastening means stationary.

3. A leaf spring as claimed in claim 1, wherein the two portions of the tubular leaf respectively adjacent said two flattened ends have each a curved shape so as to constitute an eye.

* * * * *